(12) United States Patent (10) Patent No.: US 8,224,368 B2
Leonard (45) Date of Patent: Jul. 17, 2012

(54) METHOD AND APPARATUS FOR CONTROLLING TRANSMISSION POWER IN A WIRELESS NETWORK

(75) Inventor: Eric D. Leonard, Morris, NJ (US)

(73) Assignee: Alcatel Lucent, Paris (FR)

( * ) Notice: Subject to any disclaimer, the term of this patent is extended or adjusted under 35 U.S.C. 154(b) by 1438 days.

(21) Appl. No.: 10/950,767

(22) Filed: Sep. 27, 2004

(65) Prior Publication Data

US 2006/0068826 A1    Mar. 30, 2006

(51) Int. Cl.
*H04B 7/00* (2006.01)
*H04B 1/00* (2006.01)
*H04B 7/216* (2006.01)
*H04B 7/185* (2006.01)

(52) U.S. Cl. ....... 455/522; 455/67.11; 455/69; 370/342; 370/318; 370/320; 370/209; 370/335

(58) Field of Classification Search .................. 455/522, 455/67.11, 69; 370/342, 318, 320, 209, 335
See application file for complete search history.

(56) References Cited

U.S. PATENT DOCUMENTS

| 5,333,175 | A | | 7/1994 | Ariyavisitakul | |
|---|---|---|---|---|---|
| 5,727,033 | A | * | 3/1998 | Weaver et al. | 375/358 |
| 6,549,785 | B1 | * | 4/2003 | Agin | 455/522 |
| 6,628,924 | B1 | | 9/2003 | Miyamoto | |
| 6,748,232 | B1 | * | 6/2004 | Anderson et al. | 455/522 |
| 6,754,506 | B2 | * | 6/2004 | Chang et al. | 455/522 |
| 6,807,164 | B1 | * | 10/2004 | Almgren et al. | 370/342 |
| 7,227,836 | B2 | * | 6/2007 | Kong et al. | 370/209 |
| 2003/0050084 | A1 | * | 3/2003 | Damnjanovic et al. | 455/522 |
| 2003/0064743 | A1 | | 4/2003 | Chen | |
| 2003/0128674 | A1 | * | 7/2003 | Kong et al. | 370/320 |
| 2003/0199283 | A1 | | 10/2003 | Busch | |

FOREIGN PATENT DOCUMENTS

| CN | 1360410 | 7/2002 |
|---|---|---|
| JP | 11508432 | 7/1999 |
| JP | 2000307511 | 11/2000 |
| WO | 2004002008 | 12/2003 |
| WO | 2004032374 | 4/2004 |

OTHER PUBLICATIONS

Patent Office of the Peoples Republic of China, Rejection Decision, Sep. 2, 2010.
Japanese Patent Office, Office Action, Jan. 7, 2011.

* cited by examiner

*Primary Examiner* — Bobbak Safaipour
(74) *Attorney, Agent, or Firm* — Fletcher + Yoder

(57) ABSTRACT

A technique of providing wireless network service utilizes an initial threshold to determine whether a signal received from a cellular device is of sufficient strength to warrant further processing. The technique may be implemented in a power controller of a base station, where the power controller includes an outer loop power control and an inner loop power control. The outer loop power control determines the strength of the received signal and compares it to an initial threshold. If the signal strength is below the initial threshold, the outer loop power control does not process the signal further. However, if the signal strength is above the initial threshold, the outer loop power control determines whether the signal contains any errors. If not, the signal is processed normally. If so, the outer loop power control may increase the signal-to-noise (SNR) threshold of the inner loop power control, which may cause the inner loop power control to attempt to increase the transmission power of the cellular device. By increasing the transmission power of the cellular device, the received signal will typically gain strength, resulting in an error-free signal.

18 Claims, 4 Drawing Sheets

METHOD AND APPARATUS FOR CONTROLLING TRANSMISSION POWER IN A WIRELESS NETWORK

BACKGROUND OF THE INVENTION

1. Field of the Invention

The present invention relates generally to cellular telephony and, more particularly, to controlling power consumption in cellular telephony.

2. Description of the Related Art

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Mobile or cellular telephones are widely used in today's society. The first mobile phone services appeared in the United States in the mid-1940s. Back then, the cost of each mobile phone was quite high, and as a result, the market for mobile phones remained small. To serve the limited mobile phone market, mobile services within a metropolitan area used a single tower or "base station." Each mobile phone communicated with the base station using a single dedicated radio frequency (RF).

As technology improved, mobile phones became smaller and less expensive, allowing them to become more plentiful. Since each mobile phone communicated with the base station via a single frequency, the number of frequencies required to support the growing number of phones also increased. However, the number of frequencies available in the RF spectrum is limited, both physically and by regulatory agencies such as the Federal Communications Commission. To address these issues, the Advanced Mobile Phone Service (AMPS) was introduced in 1970, and AMPS became America's mobile phone standard. The AMPS system solved the problem with the limited number of available frequencies by scattering multiple low-power base stations throughout a metropolitan area, where mobile phone calls are "handed off" as the mobile phone travels around the metropolitan area. Thus, each base station defines a "cell," and a customer's mobile or "cellular" phone communicates with different base stations as the customer's call is handed off from one cell to another.

In general, handoffs can be classified as either "hard" or "soft." In a hard handoff, the connection between the mobile phone and its current cell is broken prior to establishing a connection with a new cell. Conversely, a soft handoff includes making a connection to a new cell before breaking the connection with the current cell, thus allowing the mobile phone to be connected to at least two or more base stations concurrently.

Many different types of cellular access systems exist, where each cellular access system may implement one or more of the different types of handoffs. The fundamental difference between each of the available cellular access systems is their use of two common resources, frequency and time. Frequency division multiple access (FDMA) divides the frequency and allocates each mobile phone a portion of the frequency spectrum for all of the time available. Time division multiple access (TDMA) divides the time, so that each mobile phone receives a portion of the available frequency spectrum for a portion of the available time. Code division multiple access (CDMA) allows each mobile phone to transmit over the entire frequency spectrum for the entire time. Using unique spreading codes to spread the low frequency or "baseband" data (e.g., voice information) before transforming the data to RF for subsequent data transmission. Since each code is unique, multiple users may share the entire frequency bandwidth available all of the time.

As can be appreciated, FDMA allows the entire frequency spectrum to be allocated to a single mobile phone. As a result, any given communication channel (frequency or time) cannot be reused by neighboring cells. Thus, in FDMA, the mobile phone will be commanded to terminate communication with one cell prior to establishing connection with another cell—i.e., perform a hard handoff. Unlike FDMA, CDMA has a "soft" capacity because frequency and time can be shared. That is, there is no hard limit to how many users allow on the system. Accordingly, in CDMA, the mobile phone can communicate with multiple base stations simultaneously to perform a soft handoff. In this respect, CDMA typically has the advantage of having more system capacity than the other multiple access schemes.

The practical limit on the number of mobile phones that a CDMA system can support is based on the amount of interference or noise present on the system. Specifically, as the noise increases, the system capacity decreases. Since all mobile phones transmit on the same frequency, decoding a single mobile phone signal includes distinguishing that particular signal from all received mobile phone signals. In other words, non-desired mobile phone signals are simply noise with respect to the desired mobile phone signal. Therefore, distinguishing between desired and non-desired signals becomes increasingly difficult as more mobile phones are added to the system because the system noise increases. The amount of interference caused by phone transmissions may be reduced by keeping the transmission power of the phones low. Conversely, the transmission power of each phone should be kept high enough so that the base station can retrieve the phone's signal without error. That is, the phone's transmission power should be controlled so as to achieve a desired signal-to-noise-ratio (SNR).

Power control techniques are used in CDMA, and other spread spectrum systems, for other reasons. Since phones in the CDMA system use the same frequencies, CDMA systems have a "near-far" problem. That is, phones that are near the base station may overpower phones that are farther from the base station if their transmission power of the phones is not controlled properly. For example, assume that two phones transmit the same amount of power, but one phone is substantially closer to the base station than the other. In a CDMA system, or any other system where these two phones use the same frequencies, the phone that is nearer to the base station could overpower the phone that is farther from the base station. Accordingly, a method of controlling cell phone transmission power is desirable.

SUMMARY OF THE INVENTION

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

The present invention addresses the problems discussed above by determining the strength of an incoming signal and comparing it to an initial threshold. If the strength of the incoming signal does not meet this initial threshold, the signal-to-noise ratio threshold of the base station will not be increased. Therefore, the SNR threshold of the base station will generally remain at a lower level, thus causing the transmission power of the mobile phone to remain at a lower level.

In accordance with one aspect of the present invention, there is provided a method of providing wireless network service. The method includes: providing a first threshold to an inner loop power control from an outer loop power control; determining the strength of a received signal; and if the strength of the received signal is greater than a second threshold, adjusting the first threshold based on whether the received signal contains an error.

In accordance with another aspect of the present invention, there is provided a base station for use in a wireless communications system. The base station includes: an inner loop power control; and an outer loop power control coupled to the inner loop power control, wherein the outer loop power control is configured to provide a first threshold to the inner loop power control, determine whether the strength of a signal received by the base station is greater than a second threshold, and, if the strength of the received signal is greater than the second threshold, modify the first threshold based on whether the received signal contains an error.

In accordance with a further aspect of the present invention, there is provided a method of providing wireless network service. The method includes: determining the strength of an incoming signal from a cellular device; comparing the strength of the incoming signal to an initial threshold; if the strength of the incoming signal exceeds the initial threshold, determining whether the incoming signal contains an error; if the incoming signal contains an error, increasing a signal-to-noise threshold; and if the incoming signal does not contain an error, decreasing the signal-to-noise threshold.

In accordance with yet another aspect of the present invention, there is provided a tangible medium including: code to determine the strength of an incoming signal from a cellular device; code to compare the strength of the incoming signal to an initial threshold; code to determine whether the incoming signal contains an error if the strength of the incoming signal exceeds the initial threshold; code to increase a signal-to-noise threshold if the incoming signal contains an error; and code to decrease the signal-to-noise threshold if the incoming signal does not contain an error.

BRIEF DESCRIPTION OF THE DRAWINGS

Advantages of the invention may become apparent upon reading the following detailed description and upon reference to the drawings in which.

DETAILED DESCRIPTION OF SPECIFIC EMBODIMENTS

Figure 1:
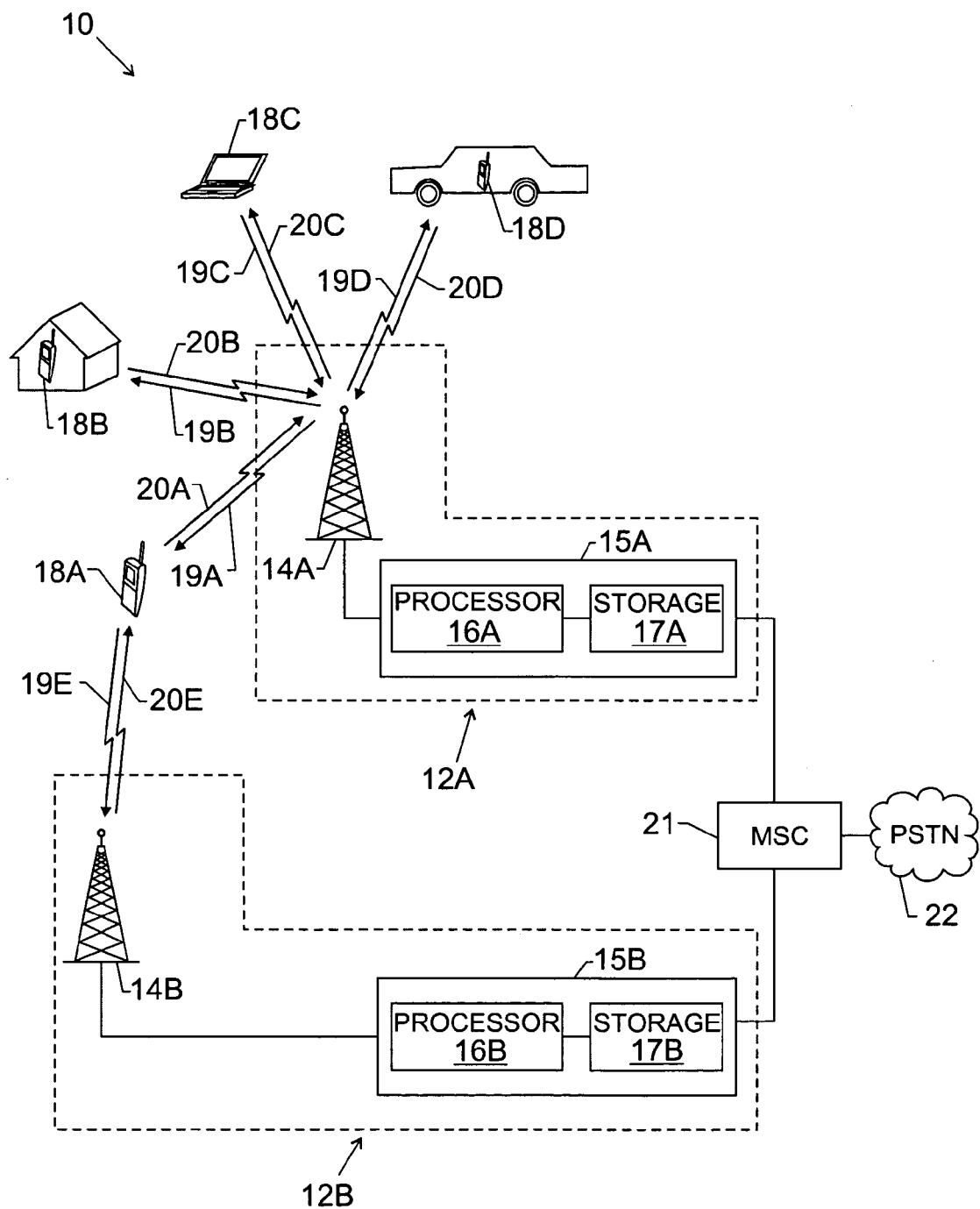
FIG. 1 discloses an exemplary cellular system in accordance with an exemplary embodiment of the present invention.

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As mentioned above, controlling transmission power in spread spectrum systems, such as CDMA, can improve system operation. Because spread spectrum systems allows multiple mobile phones to communicate with multiple base stations simultaneously, specific power control issues may arise. One particular power control issue, which is not recognized in the prior art, occurs during soft handoff. During soft handoff, certain thresholds used to determine the power transmission level of each mobile phone can become quite high and cause the mobile phone to transmit too much power. Specifically, when a base station is attempting to decode a signal transmitted by a particular mobile phone, the signals it receives from the other mobile phones appear as noise. Therefore, each base station typically includes an inner loop power control and an outer loop power control that attempt to control the transmission power of each mobile phone to a minimum power level, i.e., a power level at which the signal transmitted by each phone to reach the base station with an acceptable frame error rate. By maintaining the transmission power of the phones low, the received signals do not create as much noise, thus increasing channel capacity and facilitating signal decoding.

The inner loop power control measures received pilot energy of the signal from a given phone and compares it to a signal-to-noise (SNR) threshold. If the received power is above the SNR threshold, the phone's transmission power is too high, so the base station sends a "down" command to the phone to reduce the phone's transmission power. Conversely, if the received power is below the SNR threshold, the phone's transmission power is too low, so the base station sends an "up" command to increase the phone's transmission power. In other words, the inner loop power control attempts to maintain the received power near the SNR threshold by controlling the transmission power of the phone.

The outer loop power control adjusts the SNR threshold used by the inner loop power control in an attempt to achieve a desired frame error rate for the received signal. Because the frame error rate is a function of the power in the received signal, the outer power control loop raises this SNR threshold when a frame error is received and lowers this SNR threshold when an error-free frame is received. That is, if frame errors are occurring, the outer loop power control raises the SNR threshold of the inner loop power control, which will cause the inner loop power control to attempt to increase the transmission power of the phone to improve the frame error rate, while if frame errors are not occurring, the outer loop power control lowers the SNR threshold of the inner loop power control, which will cause the inner loop power control to attempt to decrease the transmission power of the phone to keep noise to a minimum.

A problem with this power control scheme arises occasionally, such as during a soft handoff. In this example, assume that a first base station is receiving a stronger signal than a second base station and that both base stations have equal SNR thresholds. Because the first base station is receiving a stronger signal, it will control the phone and send both "down" signals and "up" signals to the phone to adjust its transmission power. Because the second base station is receiving a weaker signal, and thus experiencing a greater frame error rate, it will typically send predominantly "up" signals to the phone in an attempt to increase the phone's transmission power to reduce the frame error rate. However, phones will ignore base stations sending "up" signals in favor of base stations that do not request a power increase. Since the phone will not increase its power sufficiently, the second base station will increase the SNR threshold of its inner loop power control in an effort to reduce its frame error rate, and it will increase the SNR threshold at a fairly fast rate, e.g., in 1 dB increments, in an effort to reduce its frame error rate as quickly as possible.

Next, assume that the mobile phone moves closer to the second base station so that the signal received by second base station increases in power. At some point, the second base station may assume control over the phone, but now the phone is transmitting at a much higher power level due to the elevated SNR threshold of the second base station. As a result, the noise on the channel is greater, and the channel capacity is reduced. Although the second base station will begin to send more "down" signals to the phone and begin to lower the SNR threshold of its inner loop power control, it lowers the SNR threshold much more slowly, e.g., in 0.01 dB increments, than it raised the SNR threshold. Consequently, during this period of time, the phone will be transmitting at a much higher power than actually required to achieve an acceptable frame error rate at the second base station, thus resulting in reduced battery life for the phone and reduced capacity for the second base station.

To address this concern, the present techniques described below cause the outer loop power control to ignore signals that are received below a particular initial threshold. In other words, the outer loop power control will not adjust the SNR threshold of the inner loop power control until the incoming signal meets a particular initial threshold. As a result, the SNR threshold of the inner loop power control will not rise as precipitously as described above and, thus, the transmission power of the phones will not be driven up as precipitously either. Examples of these present techniques are described below in the context of an exemplary cellular system with the understanding that these techniques may be applied to other types of systems, both currently foreseeable and currently unforeseeable, in accordance with the understanding of one skilled in the art.

FIG. 1 depicts an exemplary cellular system 10, which may be used to illustrate power control issues. Unlike a traditional landline telephone, which utilizes a wired connection between the phones, the cellular system 10 broadcasts voice communications through the air using radio frequency (RF) signals. The system 10 includes one or more base stations 12A-B. In general, the base stations 12A-B refer to antennas 14A-B as well as the cellular communication equipment 15A-B coupled to the antennas 14A-B. The antennas 14A-B transmit and receive RF signals. The base stations 12A-B are typically stationary base stations, however, in some embodiments they may be truck-mounted portable base stations used, for example, in emergency situations. Each base station 12A-B is typically located in a different geographical area. The particular spacing of the base stations 12A-B may depend on various factors such as geography of the cellular system 10, the number of phones in a particular area within the system 10, and the type of access system used (e.g., CDMA). For example, CDMA base stations 12A-B are typically positioned between 0.5 and 30 miles apart.

The communications equipment 15A-B includes electrical communications devices capable of transmitting and receiving RF signals and processing calls according to a particular access standard, such as CDMA. Accordingly, the communications equipment 15A-B may include radio transceiver equipment, which is sometimes referred to as a base transceiver station (BTS). Such base transceiver stations may be housed indoors or outdoors. One exemplary implementation of the communications equipment 15A-B is the Flexent® Modular Cell 4.0 manufactured by Lucent Technologies.

The communications equipment 15A-B typically includes signal processors 16A-B to facilitate communications and power control, among other functions. The signal processors 16A-B may include general purpose processors, application specific integrated circuits (ASICs), and/or field programmable gate arrays (FPGAs), for example, and the signal processors 16A-B may execute code to perform their functions. For example, the signal processors 16A-B may be coupled to storage media 17A-B that stores the executable code. The storage media 17A-B may include hard disks, random access memory (RAM), read-only memory (ROM), a flash memory, and electrically programmable read-only memory (EPROM), for example, and the storage media 17A-B may be fixed or it may be upgradeable via floppy disks, internet downloads, re-flashing, etc. In an exemplary embodiment, the signal processing ICs 16A-B may be implemented using the MPC 755 manufactured by Freescale Semiconductor. In another exemplary embodiment, both the signal processing ICs 16A-B and the storage media 17A-B may be implemented using the MSC8101 manufactured by Freescale Semiconductor.

The system 10 includes cellular devices, such as mobile devices 18A-D. Each mobile device 18A-D is capable of operating as a standalone transceiver. The mobile devices 18A-D may be, for example, cellular phones, located within houses or moving vehicles for instance (e.g., the devices 18A, 18B and 18D) or the mobile devices may be cellular circuitry located within a computer, personal digital assistant, or navigation system (e.g., the portable computer 18C). As phone calls take place within the system 10, the mobile devices 18A-D communicate with the base stations 12A-B. Communication between each mobile device 18A-D and each base station 12A-B occurs primarily via RF communications over the intervening air interface between the antennas of the respective mobile devices 18A-D and base stations 12A-B. Each communication path includes two channels or links— forward links 19A-E and reverse links 20A-E. As indicated in FIG. 1, the forward links 19A-E refer to communications coming from the base stations 12A-B to the devices 18A-D. Similarly, the reverse links 20A-E refer to communications coming from the mobile devices 18A-D to the base stations 12A-B.

Once a call is received by the communications equipment 15A-B the call is routed to its desired destination, such as one of the other mobile devices 18A-D or a traditional landline telephone (not shown in FIG. 1). Accordingly, base stations 12A-B are typically coupled to a mobile switching center (MSC) 21 to provide a voice path connection between the mobile devices 18A-D and a landline telephone through a public service telephone network (PSTN) 22 or between two mobile devices 18A-D. The connection between the base stations 12A-B and the MSC 21 may be a T-1 line or microwave connection, for example. In some embodiments, the MSC 21 may be a DMS Mobile Switching Center manufactured by Nortel Networks, a FETEX-150 CDMA MSC manufactured by Fujitsu, or a 5ESS manufactured by Lucent Technologies.

Figure 2A:
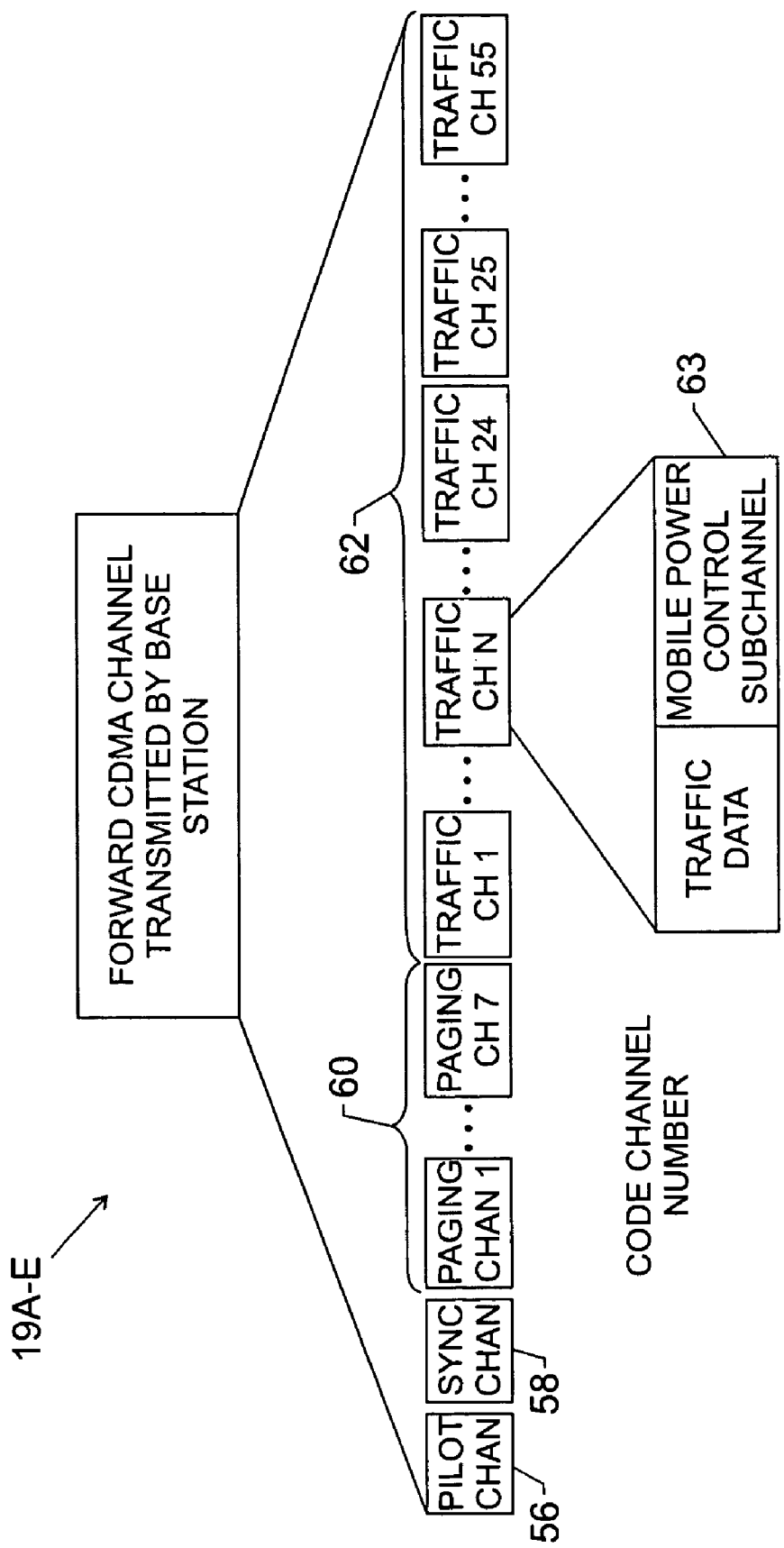
FIG. 2A depicts an exemplary forward link in accordance with an exemplary embodiment of the present invention.

To maintain calls as the mobile devices 18A-D travel within the system 10, voice and control information (which includes power control information) is communicated between the mobile devices 18A-D and the base stations 12A-B via the forward links 19A-E and the reverse links 20A-E. FIGS. 2A and B illustrate exemplary forward and reverse links respectively. Referring to FIG. 2A, each forward link 19A-E (transmitted from the base stations 12A-B to the mobile devices 18A-D) occupies a predetermined bandwidth (e.g., in CDMA2000, the bandwidth is 1.25 MHz) and includes multiple logical channels separated by unique codes. As discussed above, since CDMA allows each mobile device to use the entire bandwidth of frequency and time, these unique codes are used to differentiate between mobile devices while processing calls. Each forward link 19A-E utilizes four channels to transmit voice and control information to the mobile devices 18A-D: a pilot channel 56, a synchronization ("sync") channel 58, paging channels 60, and forward traffic channels 62. The traffic channels 62 further include traffic data and a power control sub-channel 63, which will be described in detail below.

The base stations 12A-B transmit the pilot channel 56, and the transmission power of mobile devices 18A-D may be initially configured by measuring the pilot channel 56, as discussed below with regard to open loop power control. The base stations 12A-B also continually transmit the sync channel 58 allowing the mobile devices 18A-D to synchronize with the base stations 12A-B. Synchronizing with the base stations 12A-B provides the mobile devices 18A-D with the system time and the identification information from each base station 12A-B. CDMA, for example, uses up to seven of the paging channels 60. The paging channels 60 transmit overhead information such as setup information for the traffic channel 62 to the mobile devices 18A-D. Once the traffic channel 62 is established, voice communications occur, and the mobile devices 18A-D ignore the paging channels 60. After completion of the phone call, the mobile devices 18A-D tune back into the paging channels 60 to receive commands and pages.

Figure 2B:
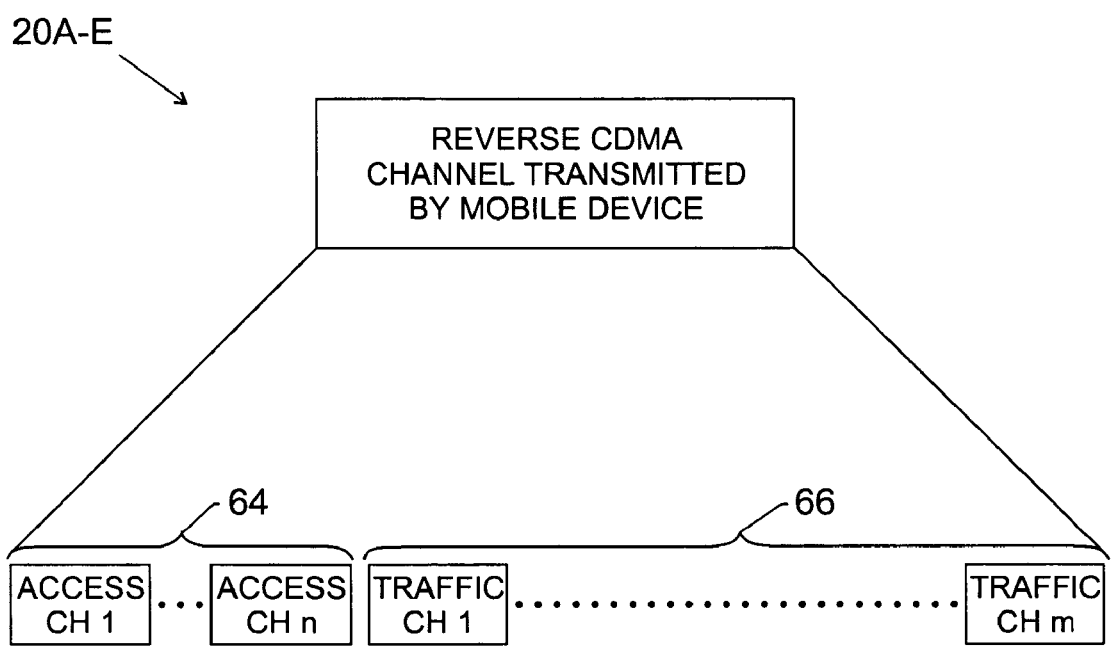
FIG. 2B illustrates an exemplary reverse link in accordance with an exemplary embodiment of the present invention.

Referring to FIG. 2B, each reverse link 20A-E (transmitted from the mobile devices 18A-D to the base stations 12A-B) typically occupies the same bandwidth as the forward links 19A-E and includes multiple logical channels separated by unique codes. Each reverse link 20A-E further includes access channels 64 and reverse traffic channels 66, which transmit voice and control information back to the base stations 12A-B.

The mobile devices 18A-D use the access channels 64 when not assigned to the traffic channel 66 (i.e., when a call is not occurring). More specifically, the mobile devices 18A-D use the access channels to: register the with the system 10, originate phone calls, respond to pages from the base stations 12A-B, and transmit overhead messages to the base stations 12A-B. The reverse traffic channel 66, on the other hand, is used when a call is occurring. During a phone call, the reverse traffic channel 66 transmits voice and control information to the base stations 12A-B. Note that the forward traffic channel 62 and the reverse traffic channel 66 are typically subdivided into "frames." Exemplary frame lengths range from about 2.5 milliseconds to 80 milliseconds.

The reverse link 20A-E power control strategies implemented by the system 10 include open loop power control and closed loop power control. As discussed below, an open loop power control is utilized before a call is connected, and a closed loop power control is utilized while a call is connected.

During open loop power control, the mobile device 18A estimates its transmission power by measuring the signal strength of the pilot channel 56 coming from the base stations 12A-B. As the mobile device 18A moves within the system 10, the signal strength of the pilot channel 56 will increase or decrease, and the mobile device 18A adjusts its transmission power accordingly. Note that this estimation is based on measuring signals on the forward link 19A and assuming that signal degradation on the reverse link 20A matches the forward link 19A. This type of open loop estimation technique may suffice while the mobile device 18A is not engaged in a phone call. However, closed loop power control is typically implemented during a phone call when voice information is conveyed via the reverse link 20A.

In closed loop power control, the base station 12A sends commands via the forward link 19A to the mobile device 18A to increase or decrease the transmission power of the mobile device 18A. The base station 12A determines these commands based on the quality of signal received from the mobile device 18A via the reverse link 20A. The closed loop power control includes inner loop power control and outer loop power control. As discussed in detail below, the inner loop power control and the outer loop power control provided by the base station 12A may be implemented by any suitable combination of hardware and/or software.

Rather than providing a closed loop power control technique having an inner loop power control and an outer loop power control as described previously, the present technique determines the power of a signal received from a cellular device, by any suitable method, to determine whether it is above a received power threshold. Until the power of the received signal reaches this initial threshold, the closed loop power control technique will not operate based on the received signal. In other words, until the received signal is sufficiently strong, the closed loop power control technique will not monitor frame errors of the signal, alter the signal-to-noise (SNR) threshold of the outer loop power control, or attempt to increase the transmission power of the cellular device.

Figure 3:
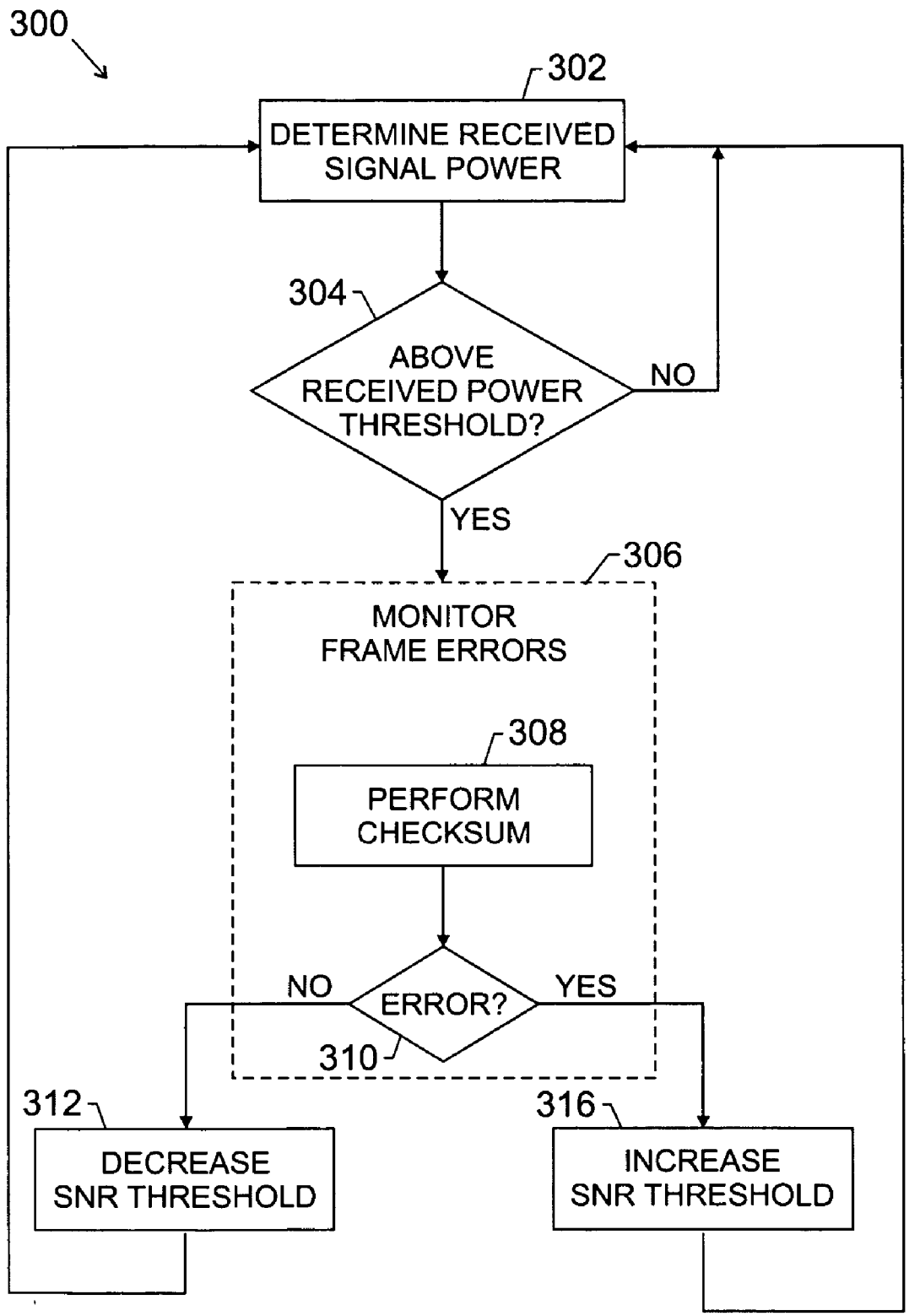
FIG. 3 depicts an exemplary technique for managing power transmission in a wireless communications system in accordance with an exemplary embodiment of the present invention.

An example of the present closed loop power control technique is illustrated in FIG. 3, which is generally designated by reference numeral 300. The technique 300 may be utilized by the base stations 12A and 12B to manage the transmission power of any of the mobile devices 18A-D. This technique may prove particularly useful when one or more mobile devices 18A-D are communicating with multiple base stations 12A and 12B simultaneously, as in the soft handoff situation described previously. Specifically, the present technique "pre-screens" the received signals from the mobile devices to determine whether further processing should take place, thus generally limiting the tendency of the base stations' power control to increase SNR thresholds based on weak signals.

As the mobile devices 18A-D move throughout the system 10, their signal strengths may vary, and as the signals from the mobile devices 18A-D are received by the base stations 12A and 12B, the base stations determine the strength of the received signals. (Block 302). The strength of each received signal is compared to an initial threshold to determine whether the signal is sufficiently strong so as to warrant further processing. (Block 304). If the strength of the received signal does not reach this initial threshold, the outer loop power control will not adjust the SNR threshold of the inner loop power control, and the base stations 12A-B merely await the next received signal. However, if the strength of the received signal reaches the initial threshold, the signal is processed in accordance with the remainder of the present closed loop power control technique.

Before describing the remainder of this technique, it should be noted that the strength of the received signal may be determined in any suitable manner. As a first example, the power of each frame, or of portions of each frame, may be measured. In one example, both the forward and reverse traffic channel 62 and 66 may be subdivided into twenty millisecond frames, for example. Each frame may be further subdivided into sixteen power control groups (PCGs) lasting 1.25 milliseconds a piece, for example. Accordingly, prior to monitoring the received signal for frame errors, the outer loop power control may measure the received signal energy from the mobile device for every PCG to determine the strength of each portion of the received frame. Further, the frame energy may be measured or calculated simply by summing the energies measured during each of the sixteen PCGs. The signal strength, however so measured, may then be compared against the initial threshold to determine whether the signal is sufficiently strong to warrant further processing.

As a second example, situations may exist where actual measurements of signal strength are either not obtained or unavailable. For instance, the PCG energies may be computed inside an ASIC, where they may remain unavailable to the outer loop power control. In this case, the strength of the received signal may be estimated by considering the number of times the particular base station 12A or 12B has commanded the mobile device to increase and/or decrease its transmission power. It should be appreciated that the inner loop power control can request a change in the mobile device's transmission power many times every second, e.g., 800 times per second. During each of these opportunities, the inner loop power control will either request the mobile device with which it is communicating to raise its transmission power, lower its transmission power, or maintain its transmission power. If over a given time period the inner loop power control has requested the mobile device to increase its transmission power more times than it has requested the mobile device to decrease its transmission power, it is likely that the transmission power of the mobile device is not strong enough to warrant further processing. Conversely, if over a given period of time the inner loop power control has requested the mobile device to decrease its transmission power more often than it has requested the mobile device to increase its transmission power, it is likely that the strength of the signal received from the mobile device is sufficiently strong to warrant further processing. Accordingly, the strength of the received signal may be determined by monitoring this activity.

As one example, the ratios of down and up commands may be monitored. If the ratio of down commands to up commands exceeds an initial threshold, then it may be assumed that the strength of the received signal is sufficient to warrant further processing. Conversely, if the ratio of down commands to up commands does not reach the initial threshold, then it may be assumed that the strength of the received signal is insufficient to warrant further processing.

Of course, it should be understood that using the ratio of down commands to up commands is merely one example of implementing this technique. As another example, the closed loop power control could merely consider the number of up commands or the number of down commands that are issued in any given period of time. In the first case, if the number of up commands issued in a given period of time exceeds a certain threshold, it indicates that the strength of the signal is not sufficient for further processing, whereas if the number of up commands does not exceed this initial threshold, it indicates that the strength of the signal is sufficient for further processing. In the latter case, if the number of down commands issued in a given period of time exceeds an initial threshold, it indicates that the strength of the received signal is sufficient for further processing, whereas if the number of down commands does not exceed this initial threshold, it indicates that the strength of the received signal is not sufficient for further processing.

Regardless of the manner in which the strength of the received signal is determined, once the strength of the received signal reaches or exceeds the initial threshold, the inner loop power control monitors the received signal for frame errors. (Block 306). In one example, the mobile device may calculate a value, or checksum, on the frame data prior to transmission and include this value or checksum in the transmitted data. The base stations 12A and 12B then perform a similar calculation on the received data. If the transmitted checksum and the received checksum match, then no frame error has occurred during transmission from the mobile device 18A-D to the base station 12A-B. (Blocks 308 and 310). If no frame error has occurred, the outer loop power control may lower the SNR threshold of the inner loop power control. (Block 312). Thereafter, the outer loop power control returns to monitor the strength of the next received signal. (Block 302). The decrease in the SNR threshold may cause the inner loop power control to attempt to decrease the transmission of power of the mobile device by transmitting more "down" commands to the mobile device.

However, if the result of the checksum calculation and comparison indicates that a frame error has occurred, the outer loop power control may raise the SNR threshold of the inner loop power control. (Block 316). Thereafter, the outer loop power control determines the power of the next received signal. (Block 302). This raised SNR threshold may cause the inner loop power control to attempt to increase the transmission power of the mobile device by sending additional "up" commands to the mobile device.

Because the strength of each received signal is determined and compared against an initial threshold prior to further processing, the outer loop power control will not increase the SNR threshold of the inner loop power control as often and, thus, the inner loop power control will not attempt to increase the transmission power of the mobile devices 18A-D as often. As a result, the strengths of the signals received by the base stations 12A and 12B from the mobile devices 18A-D are generally maintained at a lower level, thus creating less noise on the channel and increasing the capacity of the base stations 12A and 12B. As a further benefit, the mobile devices 18A-D are generally transmitting at lower power levels, thus increasing the battery lives of the mobile devices 18A-D.

It should be noted that the value of the initial received power threshold plays a role in the overall efficiency of the present technique. That is, if the initial threshold is set too low, the technique may be less effective, because the base station that is receiving a weaker signal from the mobile device may attempt to increase the SNR threshold, and thus the transmission power of the mobile device, at a rate that may approach conventional techniques. Conversely, if the initial threshold is set too high, then the base station may not assume control over the mobile device early enough and, thus, effectively decrease the capacity of the base station and, possibly, the capacity of the system 10.

Given this concern, suitable methods of fixing or adjusting the initial threshold may be considered. For example, the manufacturer of the base stations 12A and 12B may set the initial threshold at a level that meets the specifications of the system 10. These specifications may be, for example, capacity and/or performance specifications provided by the customer or judged by the manufacturer to be suitable given the makeup of the system 10. Of course, should customer and/or system requirements change, the manufacturer or other suitable service technician may alter the initial threshold in any suitable manner, such as through a programmable user interface or software upgrade. Alternatively, the level of the initial threshold may be adjustable by the customer, through a programmable user interface, for example.

As another alternative, the level of the initial threshold may be a function of the SNR of the inner loop power control. For example, the level of the initial threshold may be set at a fixed or variable offset from the SNR threshold. As one way of understanding this technique, one may consider that every time the strength of a received signal is determined, a determination is being made as to whether the signal has sufficient strength for the base station to control the mobile device. In other words, if the strength of the signal is sufficiently close to the SNR threshold, the signal is probably sufficiently strong for the base station to control the signal. Thus, if the received signal exceeds the initial threshold, yet produces a frame error, it is reasonable for the outer loop power control to increase the SNR threshold of the inner loop power control and, thus, increase the initial threshold as well. Similarly, if the strength of the received signal is below the initial threshold, and thus much less than the SNR threshold, it is reasonable for the outer loop power control to leave the SNR threshold unaltered, since the base station is probably not controlling the mobile device.

In one example, the level of the initial threshold may be set at a fixed offset, e.g., a certain number of decibels, lower than the level of the SNR threshold, e.g., 1 to 3 decibels lower. As another example, the offset of the initial threshold relative to the SNR threshold may be variable, such that the offset will be smaller when the SNR threshold is set at a relatively low level, and such that the offset will become greater as the SNR threshold rises to a relatively higher level.

It should be understood that the present techniques have been described above by way of example and that such techniques may apply in other situations as well. Indeed, the present techniques may prove useful in situations other than the soft handoff mode described by way of example above. For instance, the present techniques may be useful in a situation where a mobile device 18A is transmitting at its maximum power and is served by a single base station 12A. In this situation, the base station 12A has lost its ability to increase the power of the mobile device 18A. The base station 12A will continue to send "up" commands to the mobile device 18A, but the mobile device 18A cannot raise its power any further. Using conventional techniques, the base station 12A would raise its SNR threshold in an attempt to increase the power transmission of the mobile device. However, using the present techniques, if the weak signal from the mobile device 18A does not meet or exceed the initial threshold, the outer loop power control of the base station 12A will not increase the SNR threshold of the inner loop power control.

While the invention may be susceptible to various modifications and alternative forms, specific embodiments have been shown by way of example in the drawings and/or described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method of wireless communication, the method comprising:
providing, in a base station, a first threshold to an inner loop power control from an outer loop power control;
determining, in the base station, the strength of a received signal, wherein determining comprises estimating the strength of the received signal based upon at least one of the number of up commands and the number of down commands issued in a period of time; and
if the strength of the received signal is greater than a second threshold, adjusting, in the base station, the first threshold based on whether the received signal contains an error.

2. The method, as set forth in claim 1, comprising receiving the received signal from a cellular phone communicating with multiple base stations simultaneously.

3. The method, as set forth in claim 1, comprising receiving the received signal from a cellular phone communicating with a single base station.

4. The method, as set forth in claim 1, comprising increasing the first threshold if the received signal contains an error.

5. The method, as set forth in claim 1, comprising decreasing the first threshold if the received signal does not contain an error.

6. The method, as set forth in claim 1, wherein the first threshold comprises a signal-to-noise ratio threshold.

7. The method, as set forth in claim 1, wherein determining comprises measuring a power level of the received signal.

8. The method, as set forth in claim 7, wherein measuring comprises measuring the power level of at least one power control group of the received signal.

9. The method, as set forth in claim 8, wherein measuring the power level of at least one power control group comprises measuring the power level of each power control group in a frame of the received signal.

10. The method, as set forth in claim 7, wherein measuring comprises measuring the power level of at least one frame of the received signal.

11. A wireless base station comprising:
an inner loop power control; and
an outer loop power control adapted to provide a first threshold to the inner loop power control, to determine whether the strength of a signal received is greater than a second threshold, and, if the strength of the received signal is greater than the second threshold, to modify the first threshold based on whether the received signal contains an error, wherein the outer loop power control estimates the strength of the received signal based upon the number of up commands, the number of down commands issued in a period of time, or a combination thereof.

12. The wireless base station, as set forth in claim 11, comprising a user interface that facilitates determining the value of the second threshold by a user.

13. The wireless base station, as set forth in claim 11, wherein the outer loop power control modifies the first threshold by increasing the first threshold if the received signal contains an error.

14. The wireless base station, as set forth in claim 11, wherein the outer loop power control modifies the first threshold by decreasing the first threshold if the received signal does not contain an error.

15. The wireless base station, as set forth in claim 11, wherein the first threshold comprises a signal-to-noise ratio threshold.

16. The wireless base station, as set forth in claim 11, wherein the outer loop power control measures a power level of the received signal.

17. A method of wireless communication comprising:
determining the strength of an incoming signal from a cellular device, wherein determining the strength of the incoming signal comprises estimating the strength of the received signal based upon the number of up commands, the number of down commands issued in a period of time;

comparing the strength of the incoming signal to an initial threshold;

if the strength of the incoming signal exceeds the initial threshold, determining whether the incoming signal contains an error;

if the incoming signal contains an error, increasing a signal-to-noise threshold; and if the incoming signal does not contain an error, decreasing the signal-to-noise threshold.

18. The method, as set forth in claim 17, wherein the act of determining the strength of the incoming signal comprises the act of measuring a power level of the incoming signal.

* * * * *